US012203801B2

(12) United States Patent
Sehner et al.

(10) Patent No.: US 12,203,801 B2
(45) Date of Patent: Jan. 21, 2025

(54) RAILWAY TRACK SENSOR SYSTEM FOR VERTICAL SURFACE PRESSURE

(71) Applicant: Getzner Werkstoffe Holding GmbH, Bürs (AT)

(72) Inventors: Michael Sehner, Feldkirch (AT); Harald Loy, Schruns (AT)

(73) Assignee: Getzner Werkstoffe Holding GmbH, Bürs (AT)

( * ) Notice: Subject to any disclaimer, the term of this patent is extended or adjusted under 35 U.S.C. 154(b) by 514 days.

(21) Appl. No.: 17/438,998

(22) PCT Filed: Feb. 27, 2020

(86) PCT No.: PCT/AT2020/000005

§ 371 (c)(1),
(2) Date: Sep. 14, 2021

(87) PCT Pub. No.: WO2020/191418

PCT Pub. Date: Oct. 1, 2020

(65) Prior Publication Data

US 2022/0155131 A1 May 19, 2022

(30) Foreign Application Priority Data

Mar. 22, 2019 (AT) .................................. A 109/2019

(51) Int. Cl.

| | |
|---|---|
| ***G01G 19/04*** | (2006.01) |
| ***B61L 23/04*** | (2006.01) |
| ***B61L 27/53*** | (2022.01) |
| ***E01B 3/28*** | (2006.01) |
| ***E01B 35/12*** | (2006.01) |

(52) U.S. Cl.
CPC .......... *G01G 19/047* (2013.01); *B61L 23/047* (2013.01); *B61L 27/53* (2022.01); *E01B 3/28* (2013.01); *E01B 35/12* (2013.01)

(58) Field of Classification Search
CPC ...... G01G 19/047; B61L 23/047; E01B 35/12
See application file for complete search history.

(56) References Cited

U.S. PATENT DOCUMENTS

| | | | | |
|---|---|---|---|---|
| 2003/0089530 A1* | 5/2003 | Paine | .................. | G01G 19/047 177/163 |
| 2010/0264222 A1 | 10/2010 | Bachman et al. | | |
| 2017/0328407 A1 | 11/2017 | Zaghi et al. | | |

FOREIGN PATENT DOCUMENTS

| | | |
|---|---|---|
| CN | 101377433 | 3/2009 |
| CN | 102046445 | 5/2011 |

(Continued)

OTHER PUBLICATIONS

Machine translation of WO 00/73118 (Year: 2000).*

(Continued)

*Primary Examiner* — Natalie Huls
(74) *Attorney, Agent, or Firm* — Volpe Koenig

(57) ABSTRACT

A railway track (1) including at least two railway rails (2) and at least one measuring apparatus (3), disposed under at least one of the railway rails (2), for measuring vertical contact pressure, wherein the measuring apparatus (3) has at least one mat-shaped or planar carrying body (4) with a multiplicity of measuring sensors (5), disposed at a distance from one another, for measuring the vertical surface pressure at the respective positions of the respective measuring sensors (5).

10 Claims, 4 Drawing Sheets

1
2
12
7
6
4
8
10
9
9
14
15
3
5
13
A

(56) References Cited

FOREIGN PATENT DOCUMENTS

| | | | |
|---|---|---|---|
| CN | 201901829 | | 7/2011 |
| CN | 105190259 | | 12/2015 |
| CN | 206813023 | | 12/2017 |
| CN | 208440928 | | 1/2019 |
| DE | 112012002257 | | 7/2015 |
| EP | 2602169 | | 8/2017 |
| GB | 2364124 | | 1/2002 |
| GB | 2499602 | | 8/2013 |
| JP | H10292620 | A | 11/1998 |
| JP | 2005265791 | A | 9/2005 |
| JP | 2008224564 | | 9/2008 |
| JP | 2010132193 | | 6/2010 |
| KR | 20110003641 | | 1/2011 |
| SU | 1409879 | A1 | 7/1988 |
| WO | 0023770 | | 4/2000 |
| WO | 0037900 | | 6/2000 |
| WO | 0073118 | | 12/2000 |
| WO | 2009062464 | | 5/2009 |
| WO | 2012131683 | | 10/2012 |
| WO | WO-2012131683 | A2 * | 10/2012 ............. B61L 1/165 |
| WO | 2017142486 | | 8/2017 |

OTHER PUBLICATIONS

Rail.one, Integrated Monitoring System (IMS) for Sleepers, www.railone.com, 2 pgs., Jan. 2018.

Tekscan®, Pressure Mapping Sensor 5260, Pressure Mapping, Force Measurement, and Tactile Sensors, www.lekscan.com, Jan. 2018.

McHenry, Michael T., Pressure Measurement at the Ballast-Tie Interface of Railroad Track Using Matrix Based Tactile Surface Sensors, University of Kentucky UKnowledge, Theses and Dissertations—Civil Engineering, 123 pages, 2013.

* cited by examiner

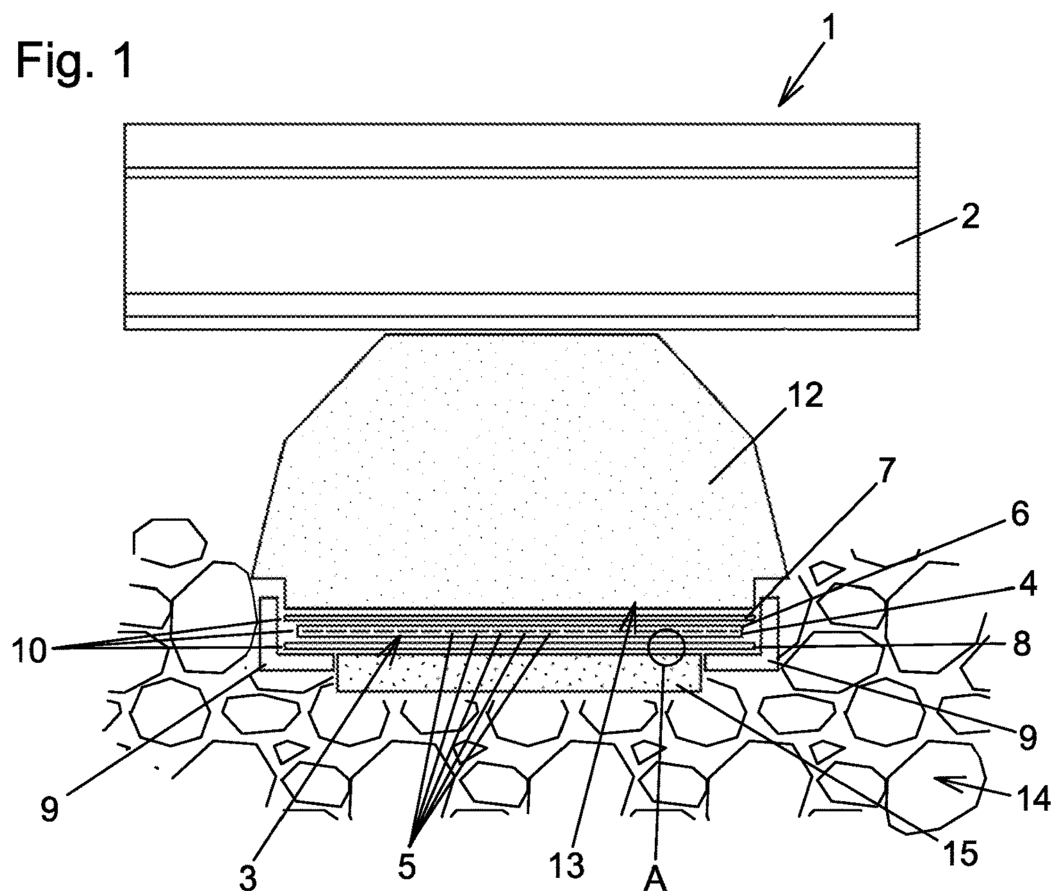
Fig. 1
1
2
12
7
6
4
8
10
9
9
14
15
3
5
13
A
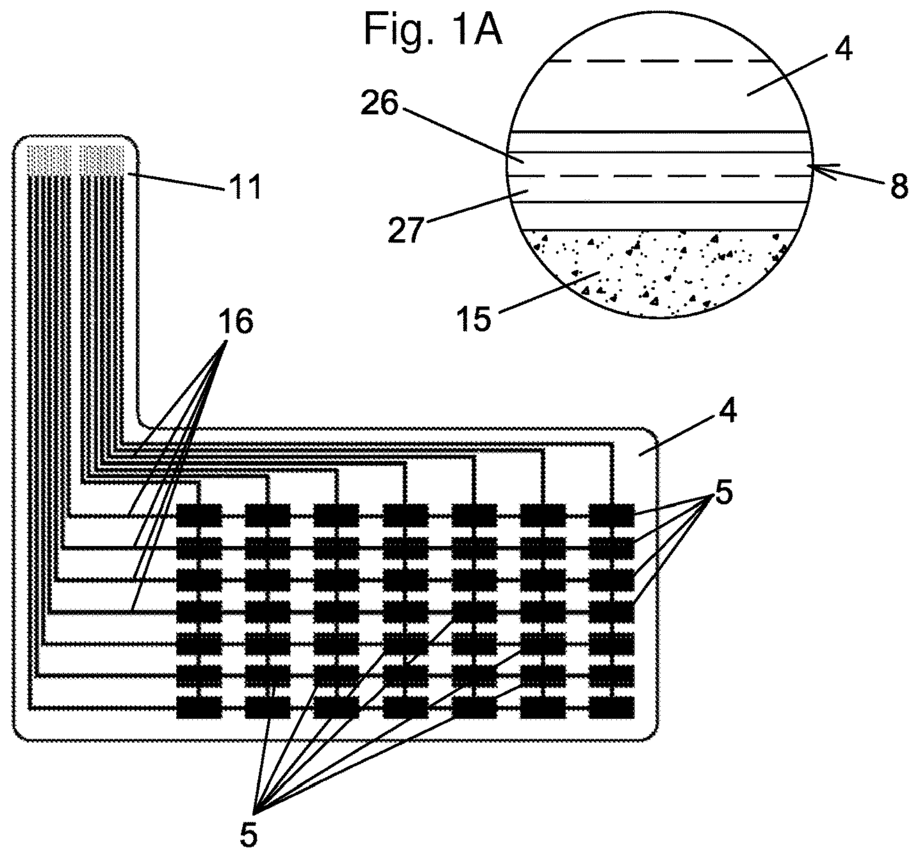
Fig. 1A
4
26
8
27
15
Fig. 2
11
16
4
5
5

RAILWAY TRACK SENSOR SYSTEM FOR VERTICAL SURFACE PRESSURE

TECHNICAL FIELD

The present invention relates to a railway track system with at least two railway rails and at least one measuring apparatus which is arranged below at least one of the railway rails for the measurement of vertical surface pressure.

BACKGROUND

In the prior art, it is known, for example, from WO 00/23770 A1 to provide measuring apparatuses below railway rails for the measurement of vertical surface pressure. In WO 00/23770, in each case one load cell is installed to this end in sleepers which are arranged below the railway rails. Track scales of this type which are known in the prior art serve to weigh railway wagons while they are moving over the weighing section.

SUMMARY

It is an object of the invention to develop a railway track system of the abovementioned type in such a way that the state of the railway track system below the railway rail can be detected in an improved manner using measuring technology.

To this end, the invention provides that the measuring apparatus has at least one mat-shaped or panel-shaped carrier body with a multiplicity of measuring sensors which are arranged spaced apart from one another for the measurement of the respective vertical surface pressure at the position of the respective measuring sensor.

In contrast to the abovementioned prior art, in which the measuring apparatuses supply a single measured value for the vertical surface pressure, the multiplicity of measuring sensors which are arranged in or on the carrier body in the case of the measuring apparatus which is provided according to the invention also allow a multiplicity of measured values which are arranged in a spatially distributed manner to be made available at the same time, by each of the measuring sensors measuring the vertical surface pressure at its position.

In this way, the distribution of the vertical surface pressures in the surface and also their changes can be determined, for example, over the course of time. This can be used, for example, to detect the distribution of contact points and their magnitude and position using measuring technology and/or else to determine and/or to monitor changes which occur over time as a result of loads and/or settling in the railway track system below the railway rail.

Moreover, the effect of the introduction of elastomeric intermediate layers such as, for example, sleeper pads, intermediate layers, intermediate panels and/or undergravel mats, can be studied and detected using measuring technology in a targeted manner on the basis of railway track systems according to the invention.

To this end, the measuring sensors are favorably arranged in a flatly distributed manner in the mat-shaped or panel-shaped carrier body. It is particularly preferably provided that the individual measuring sensors are arranged spaced apart from one another in the horizontal direction in the mat-shaped or panel-shaped carrier body of the measuring apparatus. Generally speaking, it is possible with the use of railway track systems according to the invention to carry out a method, in the case of which the distribution of the vertical surface pressure in terms of the area (or, in other words, the spatial distribution of the vertical surface pressure) is measured below the railway rail, in particular as a function of time. In this way, changes thereof can also be measured or detected.

Railway track systems according to the invention can also be called trackage or track. Railway track systems according to the invention can be configured as crossings or points or can include crossings or points. Railway track systems according to the invention can also be, however, a straight section or a section which runs around a curve with only two railway rails in the simplest case.

The vertical surface pressure is determined, as is well-known, as a force which acts vertically on an area, that is to say as a force per unit area, and is indicated, for example, in the unit $N/mm^2$ (Newtons per square millimeter).

The carrier body of the measuring apparatus connects the individual measuring sensors to one another. In the case of mat-shaped carrier bodies, the carrier bodies are flexible per se. For example, a carrier film can be used as a mat-shaped carrier body. In the case of panel-shaped carrier bodies, the carrier bodies are rigid per se, that is to say are configured as a panel. In both cases, however, the carrier bodies are of course designed in such a way that the measuring sensors which are attached or fixed to them can also measure the vertical surface pressure at the respective position of the measuring sensor.

In preferred variants of the invention, at least one sliding layer of the measuring apparatus for decoupling horizontal forces in the case of the measurement of the vertical surface pressure is arranged above and/or below the carrier body and the measuring sensors. The said sliding layer is favorably arranged directly below and/or above the carrier body and the measuring sensors. The sliding layer ensures that horizontal transverse forces are decoupled during the measurement, that is to say are not detected by the measuring sensors and also do not impair the latter. The sliding layer therefore ensures that the measuring sensors measure only the vertical surface pressure and no horizontal transverse forces. It is favorably provided here that a coefficient of friction between a respective one of the measuring sensors and the sliding layer is 0.5 or less. This coefficient of friction is preferably 0.1 or less. The sliding layer therefore provides protection of the measuring sensors against shear forces, that is to say against forces or force components which act in the horizontal direction. The sliding layer can be configured, in particular, as a sheet which is arranged above and below the carrier body and the measuring sensors. The carrier body and the measuring sensors can be enclosed completely in a sliding layer of this type which is configured as a sheath. The sliding layer should be configured in such a way that no damage of the sliding layer can be produced by way of the vertical surface pressures which are to be expected. The sliding layer can be configured, for example, as a film. In the case of vertical surface pressures to be expected of 5 $N/mm^2$ or more, it can be, for example, a film which is reinforced by woven fabric. The sliding layer can consist, in particular, of PTFE, that is to say of polytetrafluoroethylene, or can at least comprise a material of this type. Polytetrafluoroethylene is also known under the commercial name Teflon. The sliding layer can also be used as a seal of the carrier body and the measuring sensors and therefore as a protection means against the entry of moisture from the outside if it is of correspondingly inherently closed configuration. The layer thickness of the sliding layer preferably lies in the range from 0.1 mm to 10 mm, particularly preferably from 0.15 mm to 0.3 mm. Toward the outside, that is to say on its sides which face away from the carrier body, the sliding layer can be fastened to further layers of the measuring apparatus, for example can be adhesively bonded or else can be inserted loosely with respect to the latter.

It is preferably provided that the measuring apparatus is delimited on at least one side of the carrier body by one protective panel which closes off the measuring apparatus to the outside. In each case one protective plate is preferably situated on the two sides of the carrier body which lie opposite one another. In this context, it is favorably provided that the measuring apparatus is delimited on two sides of the carrier body which lie opposite one another by in each case one protective panel which closes off the measuring apparatus to the outside. The protective panel or the protective panels can in each case be of single-layer or multiple-layer configuration.

One of said protective panels can form, for example, a base, with respect to which the vertical surface pressures are measured. In this case, the vertical surface pressures are as a rule input into the measuring apparatus on the side which lies opposite said protective panel which serves as a base. If, however, the body, against which the measuring apparatus bears, provides a sufficiently flat base area and if no protection against mechanical impairment or moisture is also otherwise required on the side, said protective plate which serves as a base can also be dispensed with. The protective plate which serves as a base can be manufactured from metal sheet such as, for example, steel. This can be, for example, a strong structural steel. The thickness of said protective panel favorably lies in the range between 0.1 mm and 20 mm, preferably in the range from 2 mm to 3 mm.

A protective panel can also be configured, however, on that side of the measuring apparatus, on which the vertical surface pressures to be measured are input into the measuring apparatus. In this case, as a protective layer, the protective panel serves to protect the carrier body and the measuring sensors which are arranged on it and the possibly present sliding layer against excessive forces, that is to say against overloading or destruction. In this case, in particular, the protective panel can consist of one or else of a plurality of layers with different material properties. The protective panel can therefore be configured in a sandwich design. It is possible, for example, that, in the case of said protective panel, a strong steel faces that side, on which the vertical surface pressures are input into the measuring apparatus and, furthermore, the protective panel comprises a layer which is made from a softer ductile material such as, for example, copper and faces the carrier body. Said softer ductile layer makes load distribution possible and also prevents the perforation of the sliding layer. In the case of the steel of the multiple-layer protective panel which faces the side, on which the vertical surface pressures are input into the measuring apparatus, it can also be called a layer made from steel. The terms of strong steel and softer ductile metal are to be seen in relation. Ultimately, this indicates nothing other than that the steel or the layer which is made from steel in the multiple-layer protective panel is stronger than the layer which is softer in relation and is made from ductile metal. In this case, for example, the protective panel can have a thickness between 0.3 mm and 3 mm, preferably from 0.3 mm to 1.5 mm. In the case of a sandwich or multiple-layer construction, individual layers of said protective panel favorably have thicknesses from 0.1 mm to 3 mm, preferably from 0.3 mm to 1 mm. If said protective panel is of single-layer construction, it favorably has a thickness from 0.6 mm to 1.5 mm. A single-layer construction of this type can consist, for example, of copper, spring steel, stainless steel or else structural steel. If it is a two-layer panel which is made from steel and copper, the minimum thickness of the copper layer is preferably at least 0.4 mm, and the minimum thickness of the steel is preferably at least 0.3 mm. For applications below a ballast layer, as will be shown in detail in the following text, the thicknesses of the protective panel can also be halved with respect to the above specifications, the overall thickness typically not lying below 0.3 mm, however. For applications, in the case of which the measuring apparatus is arranged between the railway rail and a railway sleeper, the thickness of the protective panels can be reduced as far as 0.15 mm. Instead of copper, other ductile, easily deformable and easily processed materials and, in particular metals such as, for example, metals with a face-centered cubic crystal structure can also be used.

If there are both a sliding layer and a protective panel, it is favorably provided that the sliding layer is arranged (preferably in each case) between the carrier body with the measuring sensors and the protective panel.

In the case of a railway track systems, in the case of which there is a risk of the measuring apparatus being impaired mechanically, it is favorably provided that the measuring apparatus has a protective frame which runs around the edges of the protective panel, preferably the protective panels, and the carrier body, which protective frame covers end faces of the protective panel, preferably of the protective panels, and of the carrier body to the outside. This is appropriate, in particular, when the measuring apparatus lies, for example, below a railway sleeper in a ballast bed. In this case, the protective frame prevents, for example, the measuring apparatus from being damaged in the case of a packing process of the ballast bed, which packing process is known per se. The protective frame can consist, for example, of steel, or can comprise at least one layer which is made from steel. As viewed in cross section, the protective frame can have, for example, a U-shaped or an L-shaped profile; flat steel parts are also possible. The wall thickness of the protective frame favorably lies in the range between 0.1 mm and 15 mm, preferably between 1 mm and 3 mm.

In preferred embodiments, the measuring apparatus has at least one connector interface for the connection of the measuring sensors to a measuring unit for recording the vertical surface pressure which is measured in each case by the measuring sensors. This is favorably a correspondingly multiple-channel measuring unit which is suitable for individually recording the vertical surface pressure measured by the respective measuring sensor, even over a corresponding time period. Such measuring units are known per se. The connector interface can be cabled or else wireless. For the protection of the connector interface and possibly also of the measuring unit which can be connected or is connected to it, the measuring apparatus can have a shaft which is surrounded by corresponding walls. Within said shaft, the connector interface and possibly also the measuring unit and possibly present connector lines can be protected against mechanical impairment from the outside. The walls of said shaft favorably consist of a correspondingly stable metal such as, for example, steel. Its shape can be adapted to a wide variety of installation situations. The wall thicknesses of said shaft favorably lie in the range from 1 mm to 40 mm, preferably from 5 mm to 15 mm. The shaft can be closed by a closable cover, with the result that, in the case of an open cover, there is access to the connector interface or else to the measuring unit which is connected to it. The connector interface and possibly also the measuring unit can be capable of being read out by a corresponding means which are known in the prior art nowadays, and can be capable of being connected to corresponding reading devices such as, for example, personal computers and the like.

The measuring sensors of the measuring apparatus which is used according to the invention are favorably suitable for measuring vertical surface pressures in an interval or at least one part of the interval from 0.01 $N/mm^2$ to 200 $N/mm^2$. The measuring range of the measuring sensors can therefore extend over the entire stated value interval or else only a part thereof. The resolution of the measuring apparatus in the horizontal favorably lies in a range between 1 mm and 1 cm. The resolution of the measuring apparatus in the horizontal results from the spacing between two adjacent measuring sensors and their size. The individual measuring sensors can be of extensive configuration, or else can be of more or less punctiform configuration. The spacing and the size of the measuring sensors, or of the area, on which a measuring sensor measures the vertical surface pressure, and therefore also the resolution in the horizontal can be adapted to the respective task.

In the case of railway track systems according to the invention, the measuring apparatuses can be arranged below the railway rail at different locations (or, in other words, in different levels), in order thus to also solve different problems. It can be provided, for example, that the railway rails are mounted on railway sleepers, and the measuring apparatus is arranged between at least one of the railway rails and at least one of the railway sleepers. It is just as possible that the measuring apparatus is arranged on an underside of the railway sleeper, which underside faces away from the railway rail. In this case, for example, it can be provided that the measuring apparatus is arranged between the underside of the railway sleeper and a ballast bed. In corresponding embodiments, instead of the railway sleepers, panels which are made, for example, from concrete and support the railway rails can also be provided. Other applications or embodiments of a railway track system according to the invention can provide that the railway rails are mounted on railway sleepers, and the railway sleepers are mounted on a ballast bed, and the measuring apparatus is arranged below the ballast bed. In all of said embodiments, elastic intermediate layers, for example in the form of sleeper pads, intermediate layers, intermediate panels or else undergravel mats, can be provided below or above the measuring apparatus.

BRIEF DESCRIPTION OF THE DRAWINGS

On the basis of the appended figures, the following description of the figures describes different examples for the configuration of a railway track system according to the invention, in order thus to explain further features and details of preferred embodiments of the invention. In the figures:

FIG. 1 shows a first design variant of a railway track system according to the invention, in the case of which design variant the measuring apparatus is arranged below a railway sleeper, FIG. 1A shows the region A from FIG. 1 on an enlarged scale FIG. 2 shows a diagrammatic illustration of the mat-shaped or panel-shaped carrier body

DETAILED DESCRIPTION

Figure 3:
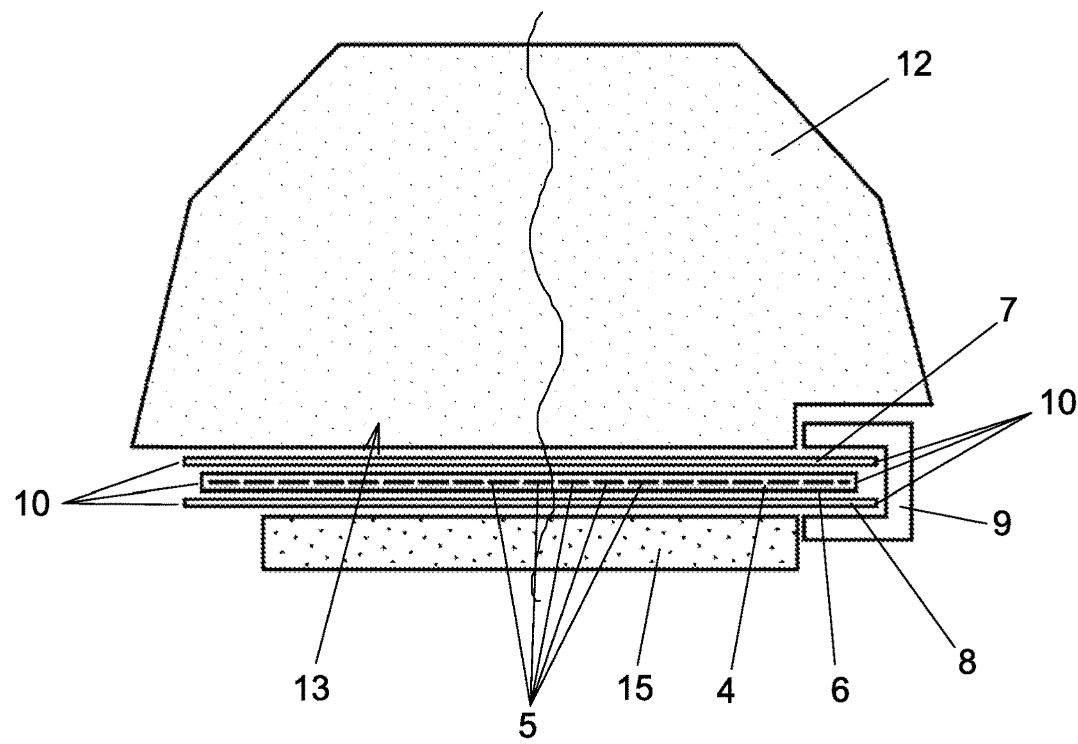
FIG. 3 shows an illustration to explain alternative variants of the embodiment according to FIG. 1

FIG. 1 diagrammatically shows a railway track system 1 in accordance with a first exemplary embodiment of the invention in a vertical section. One of the railway rails 2 which is mounted on one of the railway sleepers 12 can be seen. The fastening of the railway rail 2 on the railway sleeper 12 takes place in a manner known per se and is not shown here.

The railway sleeper 12 which can be seen here is mounted in a ballast bed 14 which is known per se and of which merely the ballast stones which surround the sleeper base are shown here.

In the exemplary embodiment according to FIG. 1, the measuring apparatus 3 for the measurement of vertical surface pressure is situated directly below the railway sleeper 12. As a result, the measuring apparatus 3 in this exemplary embodiment is arranged in the ballast bed 14. According to the invention, the measuring apparatus 3 has a mat-shaped or panel-shaped carrier body 4 with a multiplicity of measuring sensors 5 which are arranged spaced apart from one another for the measurement of the respective vertical surface pressure at the position of the respective measuring sensor 5. The measuring sensors 5 are arranged in a flatly (here, in the horizontal) distributed manner over the carrier body 4, with the result that the respective vertical surface pressure can be measured selectively at the respective position of the respective measuring sensor 5. In this exemplary embodiment, a sliding layer 6 of the measuring apparatus 3 for decoupling horizontal transverse forces in the case of the measurement of the vertical surface pressure is provided directly above and below the carrier body 4 and the measuring sensors 5. As was explained at the outset, said sliding layer 6 favorably has a coefficient of friction relative to the measuring sensors 5 of 0.5 or less. It ensures that horizontal transverse forces are not transmitted to the measuring sensors 5 and therefore also do not disrupt the measurement of the vertical surface pressure. In the exemplary embodiment which is shown, the sliding layer 6 is configured as a sheath which surrounds the carrier body 4 and the measuring sensors 5 completely. It can be, for example, a correspondingly shaped PTFE film which can possibly be fiber reinforced.

The protective panels 7 and 8 which are arranged on the two sides of the carrier body 4, which lie opposite one another, and close off the measuring apparatus 3 to the outside are also seen in FIG. 1. The protective panel 7 bears directly against the underside 13 of the railway sleeper 12. It serves as a base plate or base, with respect to which the vertical surface pressures at the respective positions are measured by way of the respective measuring sensors 5. In respect of possible embodiments of the protective plate 7 of this type which is as a base or base plate, reference is made to the different possibilities which have already been explained at the outset. The protective plate 8 which is arranged on the side which is opposite this, that is to say below the carrier body 4 and the sliding layer 6, has the function of a protective layer which is intended to protect the carrier body 4 with its measuring sensors 5 against excessive forces, against overloading and, in particular, against destruction. Secondly, however, said protective panel 8 also has to be configured in such a way that it permits the measurement of the vertical surface pressure at the respective position of the respective measuring sensor 5. A protective plate 8 which is so rigid that it prevents a position-selective measurement of the vertical surface pressure has to be avoided. Possible embodiments for a protective panel 8 of this type which serves as a protective layer, on the side, on which the vertical surface pressures are input into the measuring apparatus 3, have already been explained at the outset, with the result that reference is made hereto. In particular, said protective plate 8 can therefore also be of multiple-layer construction, for example as explained at the outset, with a layer of steel and a layer of copper or another ductile metal or material. FIG. 1A shows the region A from FIG. 1 on an enlarged scale. It can be seen clearly there that the protective plate 8 has the layer which is made from ductile metal 26 and faces the carrier body 4. The steel sheet 27 or the layer made from steel 27 which faces the side, on which the vertical surface pressures (here, those of the ballast of the ballast bed 14) are input into the measuring apparatus 3, can also be seen clearly.

In order to prevent damage of the measuring apparatus 3, in particular on the end faces 10 of the protective panels 7 and 8 and of the carrier body 4, a protective frame 9 which runs around the protective panels 7 and 8 and the carrier body 4 on the edges is provided in this exemplary embodiment. In FIG. 1, this is of L-shaped configuration in cross section. In particular in the case of packing which is known per se of the ballast bed 14, said protective frame 9 prevents damage of the measuring apparatus 3. In FIG. 1, an elastomeric sleeper pad 15 which is known per se and is of single-layer or multiple-layer construction is situated below the measuring apparatus 3 and, in particular, its protective panel 8. A very wide variety of embodiments of sleeper pads of this type are known in the prior art, and can be used here. The sleeper pads 15 firstly have elastic damping properties in order to damp vibrations. Secondly, sleeper pads 15 of this type favorably also have plastic properties, in order to hold the ballast of the ballast bed 14 as far as possible in position below the railway sleeper 12. The sleeper pad 15 is optional. It can therefore be present or else not present.

In this first exemplary embodiment of the invention according to FIG. 1, a spatial and temporal measurement of the position of the contact area between the underside 13 of the railway sleeper 12 and the ballast stones of the ballast bed 14 can be measured by way of the measuring apparatus 3. Here, each measuring sensor 5 supplies a measured value of the vertical surface pressure which is individual to the position of said measuring sensor 5. As a result, the position and extent of the contact area between the stones of the ballast bed 14 and the underside of the railway sleeper 12 can be detected using measuring technology in a manner which is resolved in area terms. If the vertical surface pressures at the individual positions of the respective measuring sensor 5 are measured over a relatively long time period, redistributions of the ballast stones in the ballast bed 14 which take place by way of redistribution and/or settling processes and therefore displacements and changes of the contact area can thus also be measured and monitored. Furthermore, it is also possible for the effect of a sleeper pad 15 to be detected using measuring technology and to be quantified, by a comparison being carried out between measurements, in the case of which the sleeper pad 15 is present, and measurements, in the case of which the sleeper pad 15 has been dispensed with. The effect of various types of sleeper pads 15 can thus also be researched using measuring technology by way of the railway track system 1 according to the invention.

FIG. 2 diagrammatically shows a plan view of a carrier body 4 with a multiplicity of measuring sensors 5 which are arranged spaced apart from one another for the measurement of the respective vertical surface pressure at the position of the respective measuring sensor 5. The size, number and arrangement of the measuring sensors 5 on the carrier body 4 can be adapted to the respective measuring task. The desired resolution horizontally can be achieved by way of corresponding size and spacing and number of the measuring sensors 5. Said resolution favorably lies in the range which has already been mentioned at the outset of from 1 mm to 1 cm. The measuring sensors 5 should be suitable for measuring vertical surface pressures in an interval or at least a part of an interval from 0.01 $N/mm^2$ to 200 $N/mm^2$. The correspondingly arranged measuring sensors 5 are in any case connected in a manner known per se by way of connector lines 16 to the connector interface 11. A corresponding measuring unit can be connected directly or indirectly to said connector interface 11, in order to record, forward or process in some other way the vertical surface pressures which are measured at the respective position by means of the measuring sensors 5. The connector interface 11 can be configured in a wireless manner or as a cable connection. Measuring units 17 which can be connected correspondingly to the connector interface 11 are known in the prior art. The carrier body 14 can be of flexible configuration as a mat, or of inherently rigid configuration as a panel.

FIG. 3 shows variants of the exemplary embodiment from FIG. 1, only the railway sleeper 12 with the measuring apparatus 3 which is arranged below it being shown, however. One variant is indicated on the left-hand side of FIG. 3, in the case of which variant there is no protective frame 9. On the right-hand side of FIG. 3, a protective frame 9 which covers the end faces 10 of the protective panels 7 and 8 and of the carrier body 4 is provided, which protective frame 9 forms a U-shaped profile in vertical section. Otherwise, the explanations with respect to FIG. 1 apply.

Figure 4:
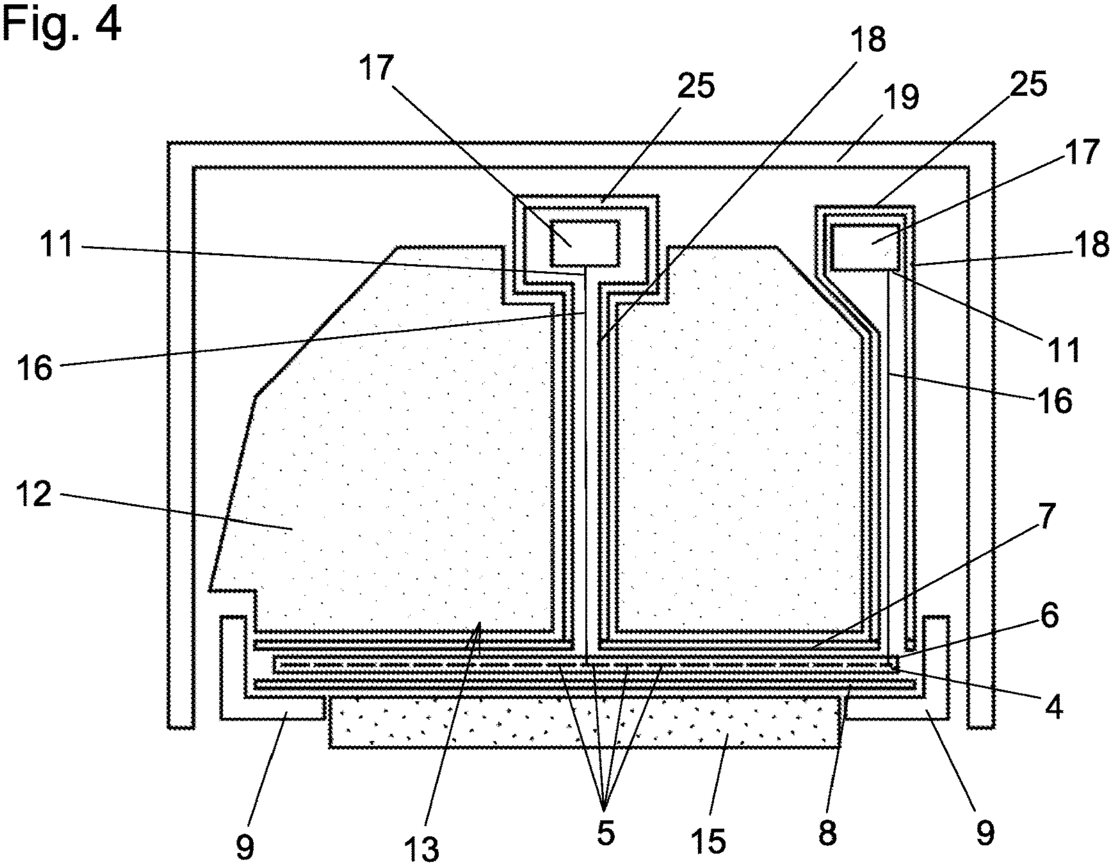
FIG. 4 shows an illustration to explain possibilities for the configuration of shafts for the connection of measuring units.

FIG. 4 diagrammatically shows different variants as to how shafts 18 can be configured on the railway sleeper 12, in order to protect the connector lines 16 of the measuring sensors 5, the connector interface 11 and the connected measuring unit 17 against external influences. The different variants of the configuration of said shaft 18 which might also be called cable shafts have already been described at the outset. FIG. 4 shows, by way of example, a variant of the shaft 18 which is guided centrally through the railway sleeper 12 and in the case of which the measuring unit 17 is also protected at the upper end of the shaft. As an alternative, one variant of a shaft 18 which is arranged on the edge (here, on the right-hand side) is shown, which variant is arranged laterally on the railway sleeper 12. The measuring unit 17 is also received in the shaft 18 in this variant. In the case of the two variants, the shaft 18 is favorably closed at its upper end in a reclosable manner by means of a cover 25 which can be opened, with the result that the measuring unit 17 can be connected to and can also be removed again from the connector interface 11 through said upper opening in the case of a correspondingly removed cover 25. The type of connection and the type of configuration of the measuring unit 17 can be carried out in a wide variety of different embodiments which are known per se in the prior art, with the result that they do not need to be described further here.

In order to make additional protection against mechanical influencing or against destruction of said measuring equipment possible, there can additionally also be a protective hood 19 which is put over the corresponding region of the railway sleeper 12 and over the shaft or shafts 18. Said protective hood 19 can be secured, for example, by way of concrete anchors on the sleeper. Favorable embodiments in any case provide that the protective hood 19 is of removable configuration. The ballast bed 14 and the railway rail 12 are also not shown in FIG. 4. FIG. 4 is likewise, however, a variant of the exemplary embodiment according to FIG. 1, with the result that further explanations in this respect can be dispensed with, with reference to the corresponding comments further above.

The shaft 18 and the protective hood 19 are favorably of watertight configuration. They can be produced by way of welding together of corresponding metal parts or by way of adhesive bonding. The individual elements can of course also, however, be screwed, riveted and equipped with various sealing compounds in order to establish the required watertightness. All of this can be adapted to the respective application.

Figure 5:
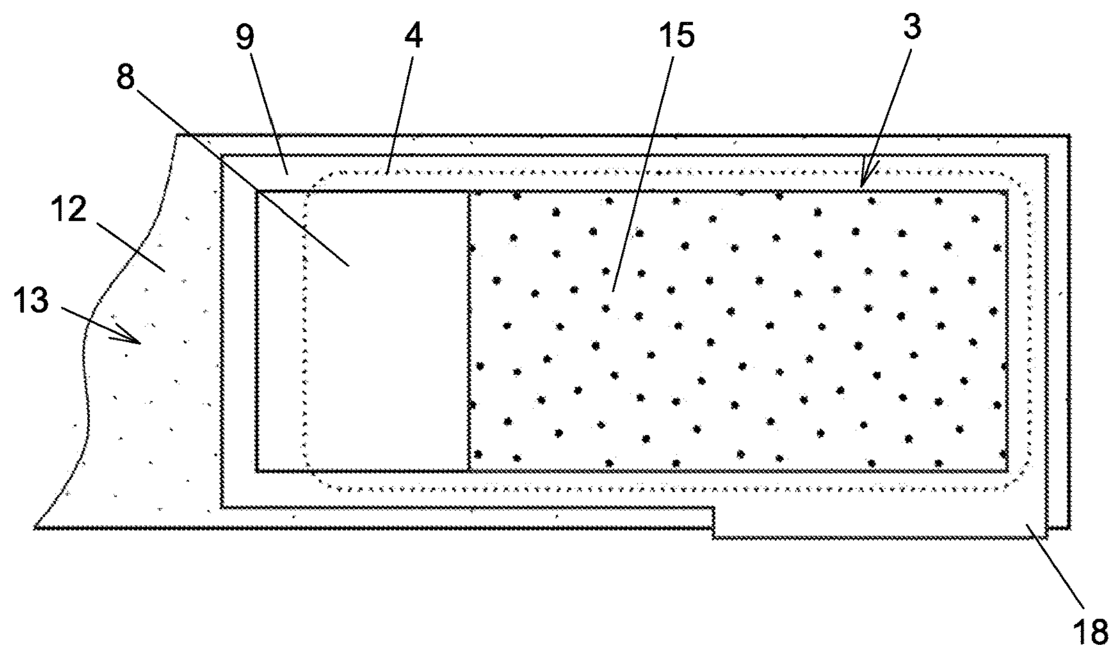
FIG. 5 shows a view from below of the railway sleeper according to FIG. 1

FIG. 5 shows a diagrammatic view from below of the underside 13 of the railway sleeper 12 from FIG. 1 in the region, in which the measuring apparatus 3 is arranged. The protective frame 9 and, in a part region, also the lower protective plate 8 with the sleeper pad 15 which is arranged over part of the area thereof can be seen. The sleeper pad 15 can be arranged below the measuring device 3 or the railway sleeper 12 over part of the area, over the complete area or, as has already been explained at the outset, not at all. FIG. 5 shows an arrangement of the sleeper pad 15 over part of the area, with the result that a part of the protective panel 8 remains free. A construction of this type can be used directly, for example, to compare the effect of the sleeper pad 15 with the absence of the sleeper pad 15. The extent of the carrier body 4 is illustrated using dashed lines in FIG. 5. The measuring apparatus 3 can extend over the complete area over the entire underside 13 of the railway sleeper 12, or else can be configured only in part regions of the underside 13 of the railway sleeper 12, as shown by way of example in FIG. 5.

Figure 6:
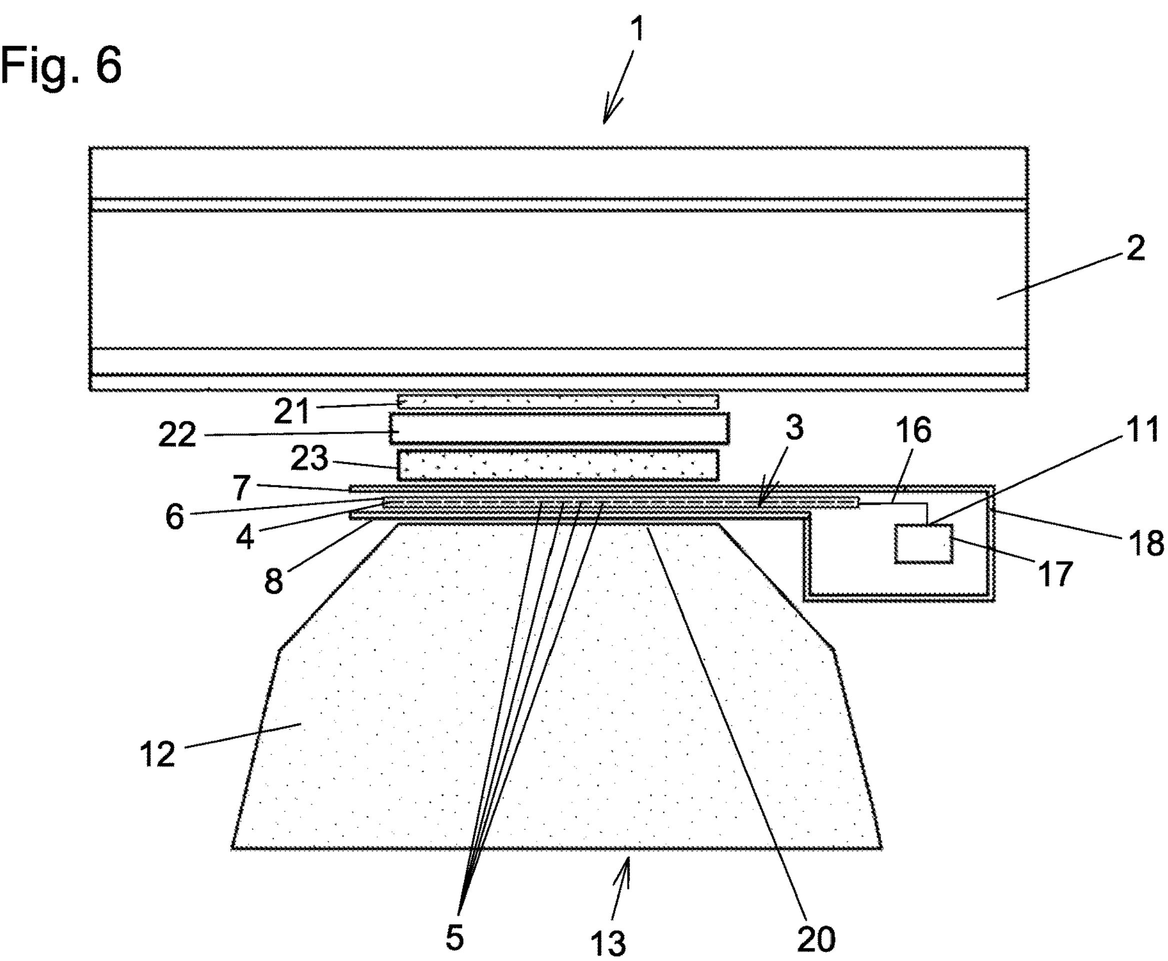
FIG. 6 shows one exemplary embodiment of a railway track system according to the invention, in the case of which exemplary embodiment the measuring apparatus is arranged between the railway rail and the railway sleeper

FIG. 6 shows one variant, in the case of which the measuring apparatus 3 is arranged between the railway rail 2 and the railway sleeper 12. In the variant according to FIG. 6, the measuring apparatus 3 lies directly on the upper side 20 of the railway sleeper 12. In this exemplary embodiment, a layer sequence consisting of an elastomeric intermediate layer 21, an inherently rigid corrugated panel 22 and a once again elastomeric intermediate panel 23 is situated between the railway rail 2 and the upper protective panel 7 of the measuring apparatus 3. Apart from the fact that there is no protective frame 9 in this exemplary embodiment, the measuring apparatus 3 of this exemplary embodiment can be of analogous configuration with respect to the first exemplary embodiment, with the result that reference is made in this regard to said descriptions. This also applies to the shaft 18 with the measuring unit 17 which is connected via the connecting interface 11 and the connector lines 16 to the measuring sensors 5 which are arranged on the carrier body 4.

By way of the variant which is shown in FIG. 6, in each case the vertical surface pressures can be measured at the respective position of the multiplicity of measuring sensors 5. As a result, it can be mapped how the vertical loads which the railway rail 2 inputs into the railway sleeper 12 are distributed over the area. Via a corresponding measurement over a relatively long time period, changes in said load distribution can be monitored and verified. The construction can also be used to detect the effect of the elastomeric intermediate layers (here, in the form of the intermediate layer 21 and the intermediate panel 23) using measuring technology. By way of the arrangement of different types of elastic intermediate layers 21 or intermediate panels 23, their effect in the case of the load input from the railway rail 2 into the railway sleeper 12 can be measured and can be shown in a manner which is resolved in terms of area. The resolution of said measurement horizontally can be adapted to the respective measuring task by way of corresponding size and spacing of the measuring sensors 5 on the carrier body 4.

Figure 7:
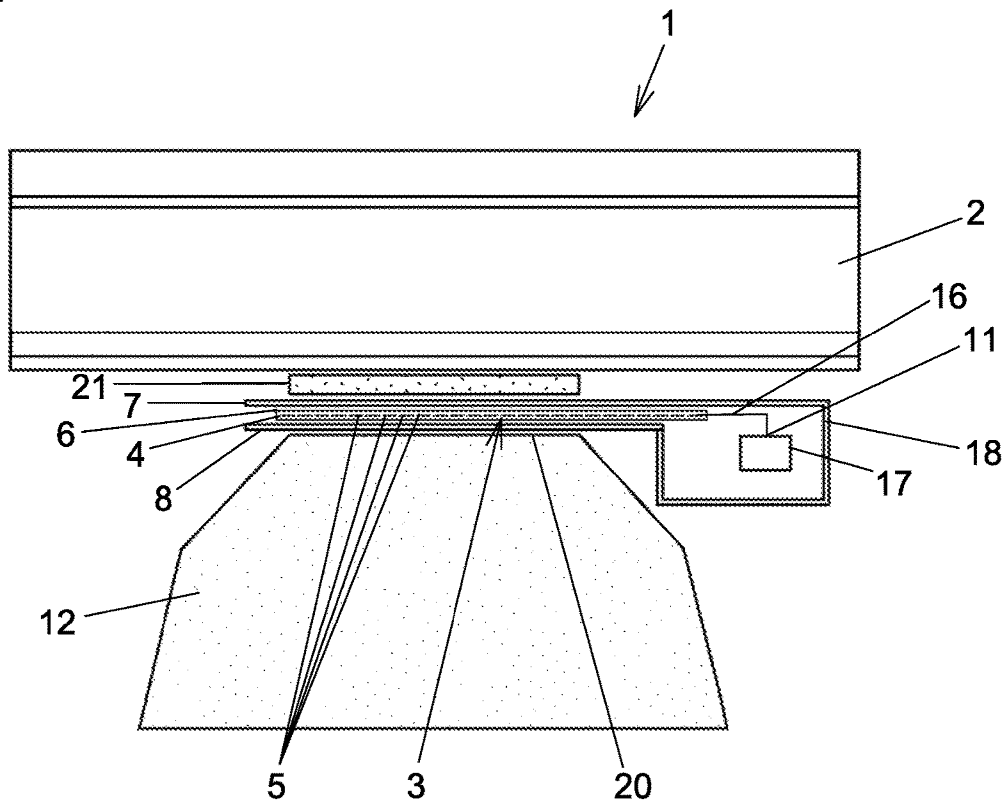
FIG. 7 shows a further exemplary embodiment of a railway track system according to the invention, in the case of which further exemplary embodiment the measuring apparatus is arranged between the railway rail and the railway sleeper, an FIG. 8 shows one design variant of the invention, in the case of which design variant the measuring apparatus is arranged below a ballast bed.

FIG. 7 shows a variant which is similar to FIG. 6 and in the case of which, instead of the sequence of the intermediate layer 21, the corrugated panel 22 and the intermediate panel 23, only the intermediate layer 21 is arranged between the measuring apparatus 3 and the railway rail 2. Intermediate layers 21 and intermediate panels 23 and corrugated panels 22 can of course also be dispensed with completely. The fastening of the railway rail 2 to the railway sleeper 12 is not shown in FIGS. 6 and 7. It can be configured as known in the prior art.

Figure 8:
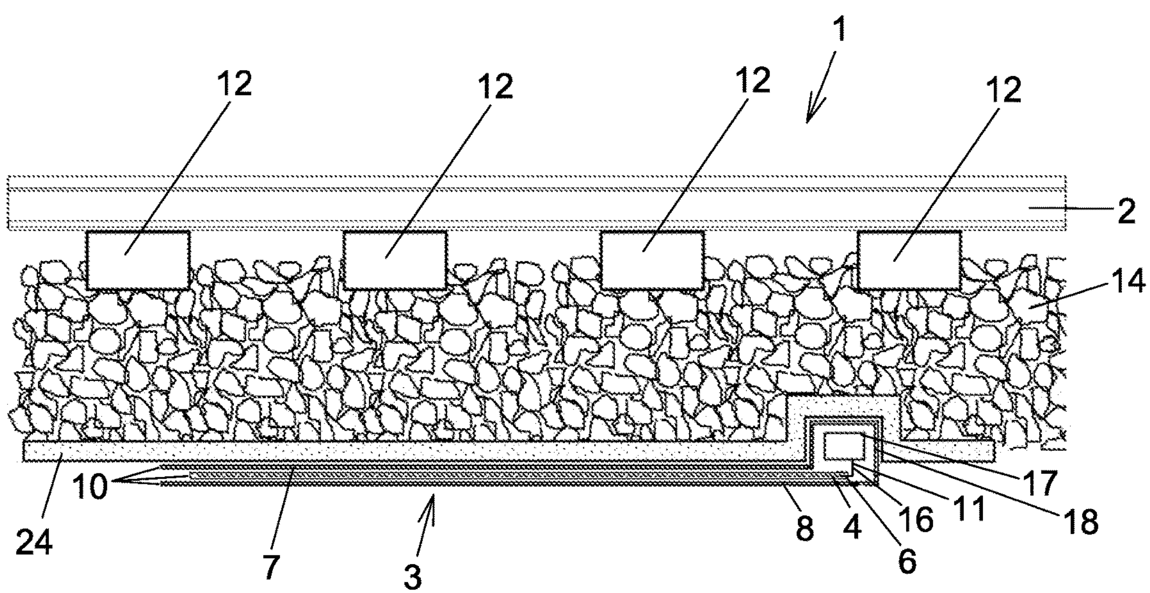

FIG. 8 shows one embodiment according to the invention of a railway track system 1, in the case of which embodiment the railway rails 2 are mounted on railway sleepers 12, and the railway sleepers 12 are mounted on a ballast bed 14, and the measuring apparatus 3 is arranged below the ballast bed 14. In the variant which is shown according to FIG. 8, an elastomeric undergravel mat 24 is arranged between the ballast bed 14 and the measuring apparatus 3. This undergravel mat 24 can also be dispensed with, however. The measuring apparatus 3 is fundamentally configured as explained in the first exemplary embodiment according to FIGS. 1 and 2. The protective frame 9 has been dispensed with in FIG. 8, however. The number, size and distribution of the measuring sensors 5 on the carrier body 4 of the measuring apparatus 3 can be adapted to the respective measuring task, just like the size of the carrier body 4 and therefore the size of the measuring apparatus 3. The respective vertical surface pressures can also be measured at the respective position of the measuring sensor 5 in this variant according to FIG. 8, with the result that the loads of the railway track system 1 which act on the underlying surface can be measured and shown in a manner which is resolved horizontally and/or in terms of area. It is also possible here by way of the measurement over a relatively long time period for temporal changes in the position, number and/or size of the load introduction points to be measured and to be monitored. Moreover, the effect of undergravel mats 24 of different configuration can be detected and quantified in this way using measuring technology.

The different design variants which are shown by way of example in the figures illustrate that railway track systems 1 according to the invention can be of very different configuration. This applies, in particular, to the question as to where the measuring apparatus 3 is arranged below the railway rail 2. It is also possible by way of railway track systems 1 according to the invention for the input of vertical surface pressures to be measured in a manner which is resolved horizontally and/or in terms of area, and also for corresponding changes over time to be detected using measuring technology. Moreover, railway track systems 1 according to the invention make it possible for the effect of different elastomeric intermediate layers, such as, for example, the intermediate layers 21, intermediate panels 23, sleeper pads 5 and undergravel mats 24 which are used here in the different exemplary embodiments, to be detected and shown using measuring technology. Instead of the railway sleepers 12, the railway rails 2 in the case of railway track systems 1 according to the invention can also be mounted on panels which are made, for example, from concrete, or other bases. Measuring devices 3 according to the invention can also be used in embodiments of this type to carry out a very wide variety of measuring tasks.

Finally, it is also noted that corresponding measuring apparatuses 3 with at least one mat-shaped or panel-shaped carrier body 4 with a multiplicity of measuring sensors 5 which are arranged spaced apart from one another for the measurement of the respective surface pressure at the position of the respective measuring sensor 5 can be used not only in the case of railway track systems 1. Rather, it is also possible for vertical surface pressures and the distribution over the area of said surface pressures in buildings and, in particular, below elastomer layers in buildings to be measured by way of measuring apparatuses 3 of this type. Measurements of this type can take place, for example, between walls, ceilings and floors or in the case of individual point bearings or in other applications in the construction sector. In the railway sector, measuring apparatuses 3 of this type can also be used in correspondingly adapted embodiments in the case of spring-mass systems, in particular once again below and/or above elastomer layers.

LIST OF DESIGNATIONS

1 Railway track system
2 Railway rail
3 Measuring apparatus
4 Carrier body
5 Measuring sensor
6 Sliding layer
7 Protective plate
8 Protective plate
9 Protective frame
10 End face
11 Connector interface
12 Railway sleeper
13 Underside
14 Ballast bed
15 Sleeper pad
16 Connector line
17 Measuring unit
18 Shaft
19 Protective hood
20 Upper side
21 Intermediate layer
22 Corrugated panel
23 Intermediate panel
24 Undergravel mat
25 Cover
26 Ductile metal
27 Steel

The invention claimed is:

1. A railway track system, comprising:

at least two railway rails;

at least one measuring apparatus arranged below at least one of the railway rails, the measuring apparatus being configured for measurement of vertical surface pressure, the measuring apparatus includes at least one mat-shaped or panel-shaped carrier body with a multiplicity of measuring sensors arranged thereon that are spaced apart from one another for the measurement of the vertical surface pressure at respective positions of respective ones of the measuring sensors;

wherein the measuring apparatus has on at least one side of the carrier body a multiple-layer protective plate which closes off the measuring apparatus to outside, and the multiple-layer protective plate has on a side of the carrier body facing away from the railway rails, a first layer comprising a steel sheet on which the vertical surface pressures are input into the measuring apparatus, and a second layer which is made from a softer ductile metal that is located between the first layer and the carrier body.

2. The railway track system as claimed in claim 1, wherein the measuring apparatus includes at least one sliding layer for decoupling horizontal transverse forces from the measurement of the vertical surface pressure, the at least one sliding layer is arranged at least one of above or below the carrier body and the measuring sensors.

3. The railway track system as claimed in claim 2, wherein the sliding layer is arranged between the carrier body with the measuring sensors and the protective plate.

4. The railway track system as claimed in claim 2, wherein a coefficient of friction between a respective one of the measuring sensors and the sliding layer is 0.5 or less.

5. The railway track system as claimed in claim 1, wherein the measuring apparatus has a protective frame which runs around edges of the protective plate and the carrier body, the protective frame covers end faces of the protective plate, and of the carrier body to the outside.

6. The railway track system as claimed in claim 1, wherein the measuring apparatus has at least one connector interface for connection of the measuring sensors to a measuring unit for recording the vertical surface pressure which is measured by each of the measuring sensors.

7. The railway track system as claimed in claim 1, wherein the measuring sensors are configured for measuring vertical surface pressures in an interval or at least one part of the interval from 0.01 $N/mm^2$ to 200 $N/mm^2$.

8. The railway track system as claimed in claim 1, wherein a horizontal resolution of the measuring apparatus lies in a range from 1 mm to 1 cm.

9. The railway track system as claimed in claim 1, wherein the railway rails are mounted on railway sleepers, and the measuring apparatus is arranged between at least one of the railway rails and at least one of the railway sleepers or on an underside of the railway sleeper, said underside facing away from the railway rail.

10. The railway track system as claimed in claim 1, wherein the railway rails are mounted on railway sleepers, and the railway sleepers are mounted on a ballast bed, and the measuring apparatus is arranged below the ballast bed.

* * * * *